UNITED STATES PATENT OFFICE.

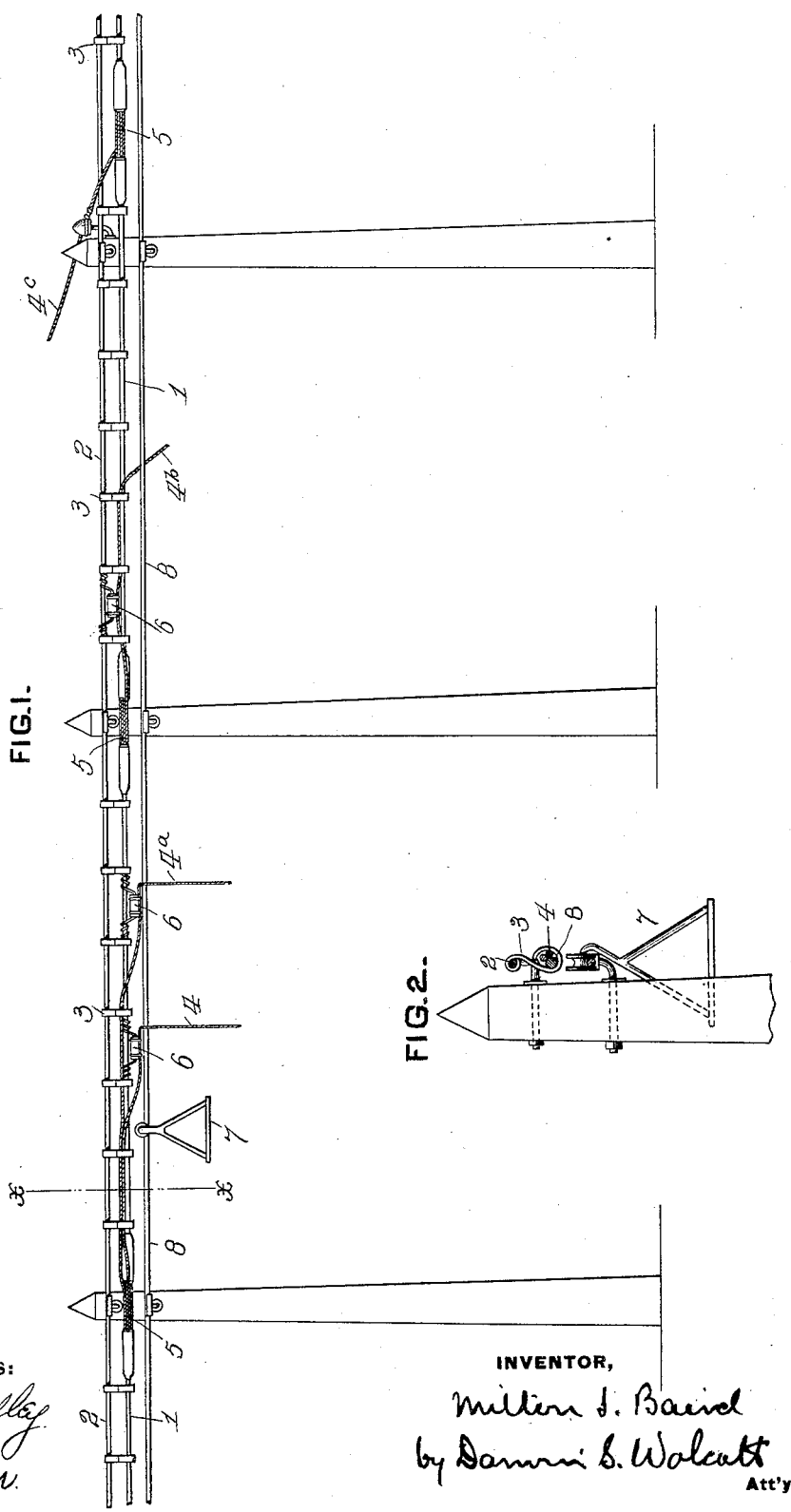

MILTON I. BAIRD, OF GLENFIELD, PENNSYLVANIA.

SYSTEM OF ELECTRICAL DISTRIBUTION.

SPECIFICATION forming part of Letters Patent No. 650,551, dated May 29, 1900.

Application filed December 1, 1899. Serial No. 738,837. (No model.)

*To all whom it may concern:*

Be it known that I, MILTON I. BAIRD, a citizen of the United States, residing at Glenfield, in the county of Allegheny and State of Pennsylvania, have invented or discovered certain new and useful Improvements in Systems of Electrical Distribution, of which improvements the following is a specification.

The invention described herein relates to certain improvements in the arrangement or distribution of main and branch wires or cables for telephone, telegraph, and other purposes. The practice now in general use consists in supporting the main cable by a carrier-wire, the cable and wire being connected by clips or a wrapping of wire or marline. When it is desired to connect branch wires or cables to the main cable, the latter is opened at a post and the branch wires or the conductors of the branch cable electrically connected to the conductors of the main cable. As the branch wires or cables lead directly from the posts supporting the main cable, great difficulty is sometimes experienced in avoiding trees and electric-light wires and other obstructions.

The object of the present invention is to provide for leading off the branch wires or cables when necessary at points other than those where the main cable is tapped.

The invention is hereinafter more fully described and claimed.

In the accompanying drawings, forming a part of this specification, Figure 1 shows a portion of a main line of cable having branches arranged in accordance with my improvement; and Fig. 2 is a transverse section on the line $x\ x$, Fig. 1.

In the practice of my invention the main cable 1, which is preferably of the form or construction set forth in application Serial No. 728,405, filed by me August 25, 1899, is suspended from the carrier-wire 2 by clips 3 or in any other suitable manner known in the art. The branch wires or conductors of the branch cable 4 $4^a$ $4^b$, &c., are electrically connected to the proper conductors of the main cable at the points 5 where the conductors of the main cable are exposed for branching purposes, as described and claimed in the application referred to. It frequently occurs that the points 5 are not in the line in which the branch wires or cable is to extend, or there is some object, as a tree or other obstruction, preventing the branch cable from being led directly away from the main cable. In such case the branch wire or cable is led parallel with the main cable to a point from which it can be led directly away from the main cable. At this point an insulator 6 is secured to the main cable or carrier-wire, as shown, and the branch cable or wire attached thereto. The portion of the branch cable between the point 5, where it is electrically connected to the main cable, and the insulator 6 or leading-away point is supported by the main cable or carrier-wire through the medium of the clips 3, as shown in Fig. 2, or in any other suitable manner. When the poles are so spaced that the exposed portions 5 of the cable are located at or closely adjacent to the poles, the connection of the branch conductors with the conductors of the main cable can be easily made from the pole; but when the exposed portions 5 of the main-cable conductors are at a distance from the poles a trolley 7 must be used. The carrier-wire 2 may at times be used as a support for the trolley, but cannot be so used when a branch, as 4, has been made in the manner hereinbefore described, and another branch, as $4^a$, from the same point 5 is to be led off between the same poles, as the first branch would prevent the trolley moving along the carrier to the point where the insulator 6 for the branch B is to be attached. To render all points of the cable accessible at all times, a second or trolley wire 8 is secured to the poles immediately below the main cable.

I claim herein as my invention—

1. In a system for the distribution of electric currents the combination of a main cable, branch conductors electrically connected to the conductors of the main cable, and supported parallel with the main cable from its point of electrical connection to the main cable to the point of "lead out" and means for holding the branch conductors fixed at the points of "lead out," substantially as set forth.

2. In a system for the distribution of electric currents, the combination of a main cable consisting of a series of protected sections, the conductors between such sections being exposed, branch conductors connected to the conductors of the main cable at the exposed points, and supported parallel with the main cable from such points of connection to the points of "lead out" and means for holding the branch conductors fixed at the points of "lead out," substantially as set forth.

In testimony whereof I have hereunto set my hand.

MILTON I. BAIRD.

Witnesses:
DARWIN S. WOLCOTT,
F. E. GAITHER.